US011487537B2

(12) United States Patent
Nidd et al.

(10) Patent No.: US 11,487,537 B2
(45) Date of Patent: Nov. 1, 2022

(54) LINKING OPERATIONAL EVENTS WITH SYSTEM CHANGES

(71) Applicant: International Business Machines Corporation, Armonk, NY (US)

(72) Inventors: Michael Elton Nidd, Zurich (CH); Altynbek Orumbayev, Prague (CZ); Jinho Hwang, Ossining, NY (US); Larisa Shwartz, Greenwich, CT (US); Jakub Krchak, Jindrichuv Hradec (CZ); Qing Wang, Chappaqua, NY (US); Frank Bagehorn, Dottikon (CH); Ota Sandr, Prague (CZ); Tomas Ondrej, Prague (CZ); Srinivasan Parthasarathy, White Plains, NY (US); Michal Mylek, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 16/951,500

(22) Filed: Nov. 18, 2020

(65) Prior Publication Data
US 2022/0156065 A1 May 19, 2022

(51) Int. Cl.
*G06N 20/00* (2019.01)
*G06F 8/77* (2018.01)
(Continued)

(52) U.S. Cl.
CPC .................. *G06F 8/77* (2013.01); *G06F 8/71* (2013.01); *G06N 20/00* (2019.01); *G06Q 10/101* (2013.01);
(Continued)

(58) Field of Classification Search
CPC ..... G06F 8/77; G06F 8/71; G06F 8/20; G06F 8/60; G06F 8/65; G06F 8/24;
(Continued)

(56) References Cited

U.S. PATENT DOCUMENTS

| | | | | |
|---|---|---|---|---|
| 6,256,773 | B1 * | 7/2001 | Bowman-Amuah | G06F 8/71 707/999.203 |
| 8,024,214 | B2 * | 9/2011 | Ellis | G06Q 10/06311 705/7.29 |

(Continued)

OTHER PUBLICATIONS

Mehdi Amoui et al., Temporal Software Change Prediction Using Neural Networks, 2009, [Retrieved on Jul. 6, 2022]. Retrieved from the internet: <URL: http://citeseerx.ist.psu.edu/viewdoc/download?doi=10.1.1.361.6009&rep=rep1&type=pdf#page=400> 6 Pages (380-385) (Year: 2009).*

(Continued)

*Primary Examiner* — Anibal Rivera
(74) *Attorney, Agent, or Firm* — Donald G. Weiss; Alexander G. Jochym (57) ABSTRACT

In an approach to linking operational data with issues, a new event is received. The new event is associated to a story, where the story is related to an identified problem within the system, and further where the new event is associated with the story using machine learning techniques. The story is associated to related change requests based on a similarity between the story and related change requests, where the similarity between the story and the related change requests is associated using the machine learning techniques. A cost is calculated for the story. Responsive to associating the new event with a specific change request, the priority of the specific change request is updated based on the cost for the story.

20 Claims, 6 Drawing Sheets

(51) Int. Cl.
*G06F 8/71* (2018.01)
*G06Q 10/10* (2012.01)
*G06Q 30/00* (2012.01)
*G06F 8/65* (2018.01)
*G06F 8/60* (2018.01)
*G06F 8/20* (2018.01)

(52) U.S. Cl.
CPC ......... *G06Q 10/103* (2013.01); *G06Q 30/016* (2013.01); *G06F 8/20* (2013.01); *G06F 8/24* (2013.01); *G06F 8/60* (2013.01); *G06F 8/65* (2013.01)

(58) Field of Classification Search
CPC .... G06N 20/00; G06Q 10/101; G06Q 10/103; G06Q 10/06398; G06Q 10/06; G06Q 10/10; G06Q 10/06375; G06Q 10/087; G06Q 30/016; G06Q 30/0201; G06Q 30/04; G06Q 30/02
See application file for complete search history.

(56) References Cited

U.S. PATENT DOCUMENTS

| | | | |
|---|---|---|---|
| 8,644,146 B1* | 2/2014 | Kurtz | H04L 41/0813 370/231 |
| 8,898,299 B2 | 11/2014 | Atkins | |
| 9,740,478 B2 | 8/2017 | Doganata | |
| 9,921,943 B2 | 3/2018 | Chen | |
| 9,948,678 B2 | 4/2018 | Tcherchian | |
| 10,044,563 B2 | 8/2018 | Guven | |
| 10,289,949 B2 | 5/2019 | Baughman | |
| 10,693,758 B2 | 6/2020 | Puri | |
| 2006/0080656 A1* | 4/2006 | Cain | G06F 8/65 717/174 |
| 2009/0089745 A1* | 4/2009 | Johnson | G06F 8/71 717/107 |
| 2012/0072781 A1 | 3/2012 | Kini | |
| 2015/0120359 A1* | 4/2015 | Dongieux | G06F 16/285 705/7.15 |
| 2017/0178038 A1 | 6/2017 | Guven | |
| 2017/0243131 A1 | 8/2017 | Kephart | |
| 2018/0204167 A1 | 7/2018 | Rayner | |
| 2018/0248754 A1 | 8/2018 | Guven | |
| 2019/0378073 A1* | 12/2019 | Lopez | G06Q 10/06375 |
| 2020/0053127 A1 | 2/2020 | Brotherton | |
| 2021/0103840 A1* | 4/2021 | Kwong | G06N 20/20 |

OTHER PUBLICATIONS

"Cloud Management", From Service Now Docs, This page was last modified on Sep. 16, 2020, pp. 1-2, <https://docs.servicenow.com/bundle/geneva-it-operations-management/page/product/cloud-provisioning/concept/c_CloudProvisioning.html>.

"How Alerts Work With Change Requests", From Service Now, This page was last modified on Sep. 16, 2020, pp. 1-3, <https://docs.servicenow.com/bundle/geneva-it-operations-management/page/product/t_operations>.

Capizzi et al., "Anomaly Detection in Devlops Toolchain", Devops 2019. Lecture Notes in Computer Science, vol. 12055. Springer, Cham, arXiv:1909.12682v1 [cs.SE] Sep. 27, 2019, https://doi.org/10.1007/978-3-030-39306-9_3.

Guven et al., "Toward Establishing Causalilty Between Change and Incident", Conference Paper Apr. 2016, DOI: 10.1109/NOMS.2016.7502929, pp. 1-7, <https://www.researchgate.net/publication/285577655>.

Guven et al., "Understanding the Role of Change in Incident Prevention", 978-3-901882-85-2 (c) 2016 IFIP, pp. 1-4.

"Jenkins, A Global Notifier That Sends Build Statuses to Bigpanda", pp. 1-3, <https://docs.bigpanda.io/docs/jenkins>.

Nedelkoski et al, "Anomally Detection From System Tracing Data Using Multimodal Deep Learning", Published 2019, Computer Science, 2019 IEEE12th International Conference on Cloud Computing (CLOUD), DOI:10.1109/CLOUD.2019.00038Corpus ID: 201813568, pp. 1-8.

Ren et al., "Time-Series Anomaly Detection Service at Microsoft", arXiv:1906.03821v1 [cs.LG], Proceedings of the 25th ACM SIGKDD International Conference on Knowledge Discovery & Data Mining. Jun. 10, 2019, 9 pages.

* cited by examiner

LINKING OPERATIONAL EVENTS WITH SYSTEM CHANGES

BACKGROUND

The present invention relates generally to the field of information technology, and more particularly to linking operational data with issues.

Site reliability engineering is a discipline that incorporates aspects of software engineering and applies them to infrastructure and operations problems. The main goals are to create scalable and highly reliable software systems.

DevOps is a set of practices that combines software development and Information Technology (IT) operations. It aims to shorten the systems development life cycle and provide continuous delivery with high software quality. DevOps is complementary with Agile software development; several DevOps aspects came from Agile methodology. DevOps core principles—involvement of the IT function in each phase of design and development of a system, heavy reliance on automation versus human effort, the application of engineering practices and tools to operations tasks—are consistent with many of the principles and practices of site reliability engineering. One could view DevOps as a generalization of several core site reliability engineering principles to a wider range of organizations, management structures, and personnel. One could equivalently view site reliability engineering as a specific implementation of DevOps with some idiosyncratic extensions.

A change request is a proposal to alter a software program or system, often brought up by the client or another team member. Change requests can originate from various sources including customers, end users, the project team, or the test team. Changes from customers and end users would normally be changes in their requirements, from the project team could come design changes, and the testing team could request code changes due to errors discovered during testing. Changes are communicated to a Site Reliability Engineer (SRE) using a Change Request (CR) form. The CR typically contains details of the project, module and component which are likely to be affected by the CR and may include reasons for the CR.

Change management in software development involves tracking and managing changes to artifacts, such as code and requirements. It is critical for effective application development. The change management process in site reliability engineering is the process of requesting, determining attainability, planning, implementing, and evaluating changes to a system. Its main goals are to support the processing and traceability of changes to an interconnected set of factors.

SUMMARY

Embodiments of the present invention disclose a method, a computer program product, and a system for linking operational data with issues. In one embodiment, a new event is received. The new event is associated to a story, where the story is related to an identified problem within the system, and further where the new event is associated with the story using machine learning techniques. The story is associated to related change requests based on a similarity between the story and related change requests, where the similarity between the story and the related change requests is associated using the machine learning techniques. A cost is calculated for the story. Responsive to associating the new event with a specific change request, the priority of the specific change request is updated based on the cost for the story.

DETAILED DESCRIPTION

The core of DevOps is to achieve product development that is responsive to the realities of operations. In a DevOps environment, after an SRE has resolved an incident, it may be appropriate to request a software change intended to prevent recurrences of that issue by issuing a change request. Having created the change request, it is then up to the developers to prioritize it along with other fixes and new features. A quantitative, objective metric for the impact of a particular change request would allow the developers to improve that prioritization, and maximize their effective impact on operations.

The present invention achieves this by linking operational observations into stories. A story is a the story is a collection of past incidents, current incidents, system alerts, comments, including SRE comments, related changes, and other artifacts, such as the incidents and events resulting from a single software bug. When a change request results from an incident, it is desirable to link it to any past occurrences, and especially to keep it updated when new occurrences are discovered. By linking the change request to a story, the present invention allows the development team to correctly prioritize the is sue.

In one example use case, an event is generated because application X is returning "Server Error" 500-series codes (a very general HTTP status code). An incident is created, along with an associated story. An engineer investigates, discovers a call in the code is using a deprecated system call to a standard internal module, and works around it by manually enabling a legacy compatibility mode on that other module. The engineer closes the incident and adds a change request to the application development team for correcting the outdated call. Two days later, the system is restarted during routine maintenance, making the manual workaround no longer active. The server errors return and are linked to the existing story by the present invention. The current story allows the recovery to be faster this time, while also automatically increasing the priority of the change request to reflect the additional recovery effort and downtime, giving it more visibility in the next sprint planning meeting. In this example, since the change request was linked to the story describing the outdated call, the present invention led to a much timelier, and likely less expensive, resolution to the issue.

In an embodiment, the present invention links software change requests to documented examples of the failure that must be resolved. This improves the clarity of the description, and simplifies the design of unit tests to validate the change. In an embodiment, the present invention discovers previous occurrences of the underlying problem and links them with the change request. In an embodiment, the present invention automatically links ongoing instances of the underlying problem to the change request, even if they occur after the request was created. Discussions from the entire story are therefore available to the development team that builds the fix.

In the context of this description, the following conventions, terms and/or expressions may be used:

The term 'alert' may denote some detectable problem spotted by a monitoring system (e.g., high CPU, series 500 HTTP response, low disk, etc.).

The term 'anomaly' may denote that a machine learning system has identified patterns (e.g., system logs) that are normal, and discovered something anomalous (e.g., abnormally many "connection failed" messages, unusual combination of container restarts and pull failures, etc.).

The term 'incident' may denote something has gone wrong with the production environment, and someone has been assigned to investigate.

The term 'event' may denote some detected thing that may indicate trouble (e.g., either an alert or an anomaly).

The term 'change request' may denote an object containing a request for changing the production environment, including approvals, and a closing status for whether the change was successful, failed, succeeded with difficulty, etc., and may also include comments on the solution and any difficulties that were encountered.

The term 'story' may denote the system object created by the present invention to allow experts to discuss an ongoing incident and to receive updates of any newly relevant events or changes that have been discovered.

Figure 1:
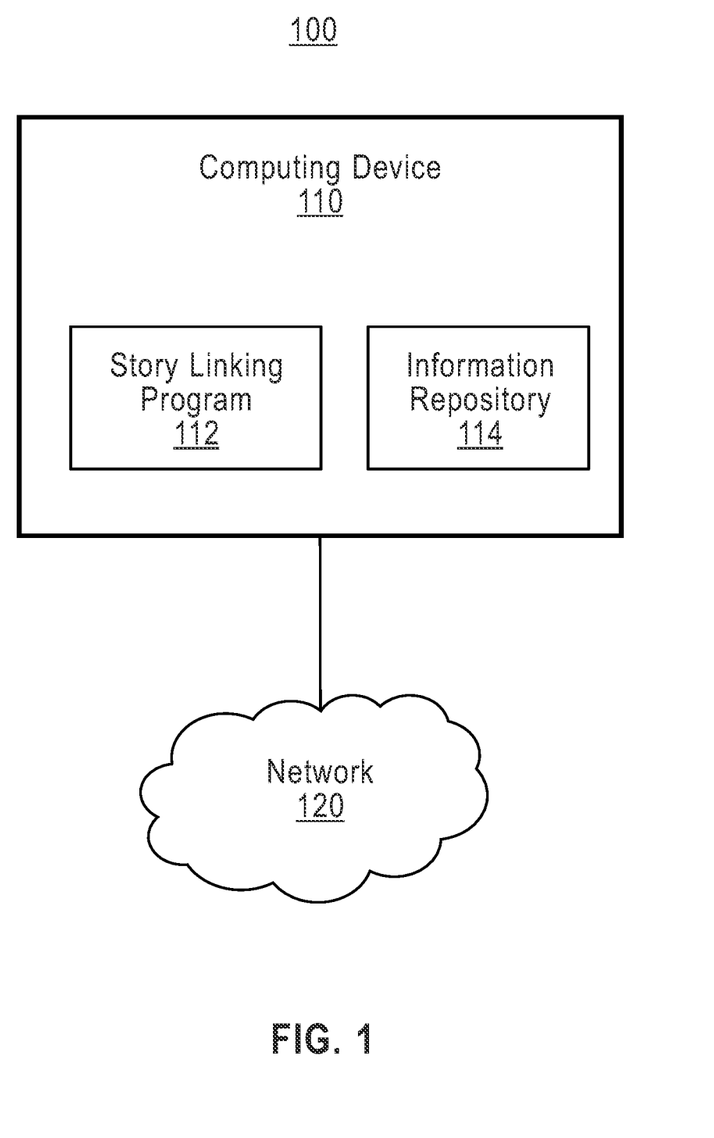
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of story linking program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes story linking program 112. In an embodiment, story linking program 112 is a program, application, or subprogram of a larger program for linking operational data with issues. In an alternative embodiment, story linking program 112 may be located on any other device accessible by computing device 110 via network 120.

In an embodiment, computing device 110 includes information repository 114. In an embodiment, information repository 114 may be managed by story linking program 112. In an alternate embodiment, information repository 114 may be managed by the operating system of the device, alone, or together with, story linking program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, CR data, issue data, story data, event data, user data, system configuration data, and other data that is received by story linking program 112 from one or more sources, and data that is created by story linking program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

Figure 2:
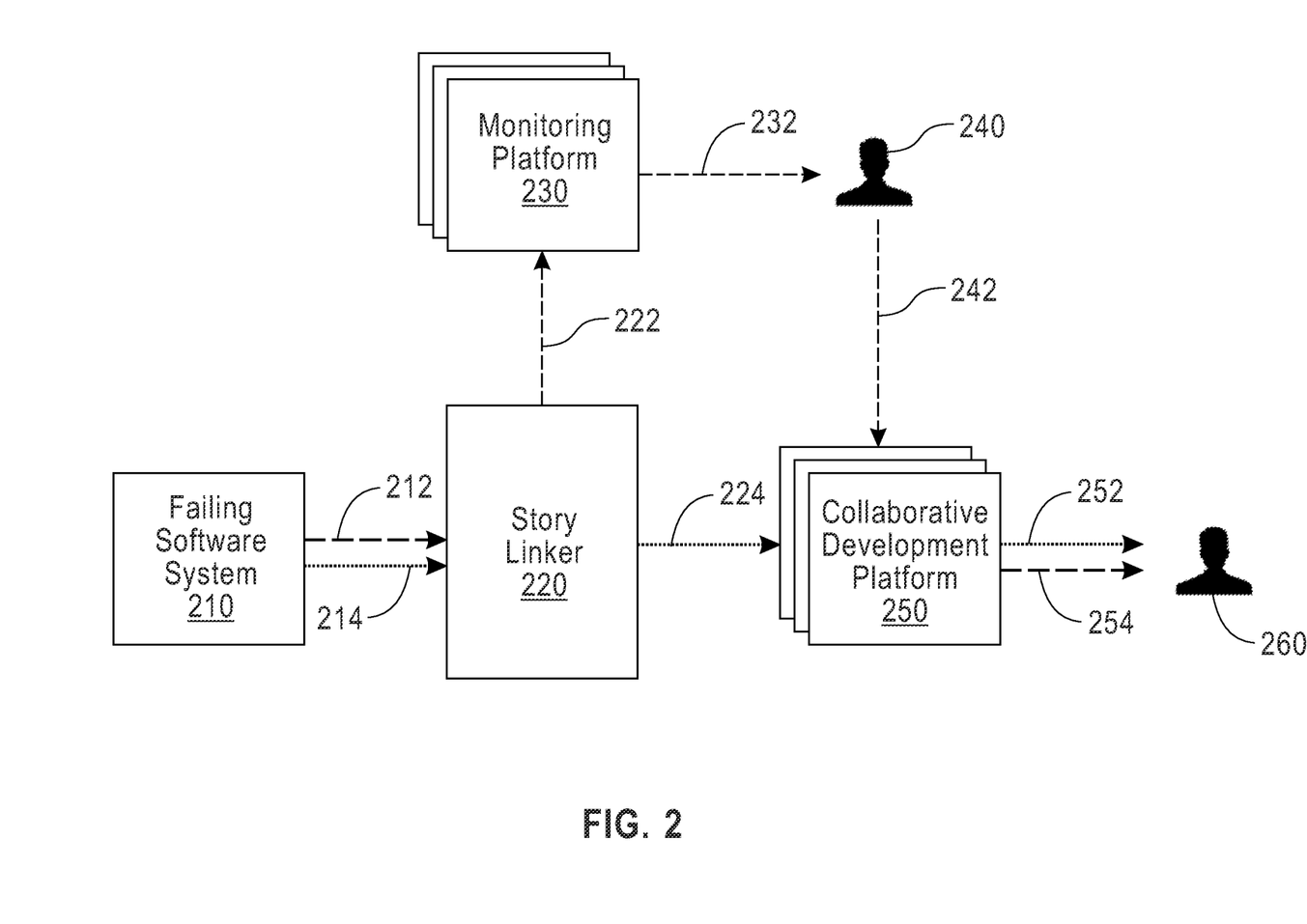
FIG. 2 is an example use case of the story linking program, in accordance with an embodiment of the present invention.

FIG. 2 is an example use case of the story linking program, in accordance with an embodiment of the present invention. In this example, failing software system 210 is an application that is running and returning an error code, e.g., "Server Error". Events are reported to story linking program 112, including new event 212 and existing event 214. It should be noted that "new event" and "existing event" are used for clarity of the example to distinguish between events associated with a new, or not previously encountered, incidents versus events associated with existing, or previously encountered incidents. In actual operation, they are just "events", and are not distinguished by story linking program 112. An event indicates a potential system problem, and can be, for example, that a CPU load is higher than a predetermined threshold, or that a user has experienced a "500-series server error." In this example, new event 212 refers to an event that was encountered for the first time, and leads to a new CR to be created by an SRE, while existing event 214 refers to an event that was previously encountered and is associated with an existing CR by story linking program 112.

New event 212 and existing event 214 are received by story linker 220, which is the main function of story linking program 112. If story linking program 112 determines that the events are related, the events are grouped together. Story linking program 112 then associates the event groups with stories, which represent incidents being resolved. If story linking program 112 determines that the events are not already associated with an incident, then story linking program 112 creates a new incident and sends incident 222 to monitoring platform 230 with the associated story. Monitoring platform 230 is the SRE platform that is used by site engineering to monitor ongoing incidents and track change requests. Notification 232 is then sent to the appropriate SRE 240 by monitoring platform 230. In the case of a new incident, SRE 240 manually creates a new change request for the developers, which is sent by notification 242 to collaborative development platform 250, which allows the developers to collaborate with story linking program 112. In an embodiment, the new CR is received by story linking program 112 to add to its database of change requests.

If story linking program 112 determines that the events are already associated with a story, then story linking program 112 automatically reports the incident to collaborative development platform 250 with the associated story via existing incident 224. If story linking program 112 determines that the priority of the associated change request should change, then story linking program 112 sends the recommendation of the new priority with the incident.

In an embodiment, collaborative development platform 250 then notifies the developers 260 associated with the change request via either new change request 252 or existing change request 254.

In an embodiment, in the process of generating the relevant annotations for a story, story linking program 112 receives change requests when they seem relevant, such as when they would have been likely to either have caused the current problem (i.e., because they affect the system in trouble, and have recently been enacted, or closed, in production), or to have solved the current problem (i.e., presumably changes that are currently open, i.e. not yet in production).

Both of these sets of changes (closed and open) are relevant to the SRE investigating the story, but changes that remains open are relevant to the management team in general, especially if it might have prevented the incident that is currently costing time and effort. Story linking program 112 provides a link back to the change request management system that will assist the prioritization of changes by adding visibility to the costs being incurred due to delayed implementation of the CR.

Figure 3:
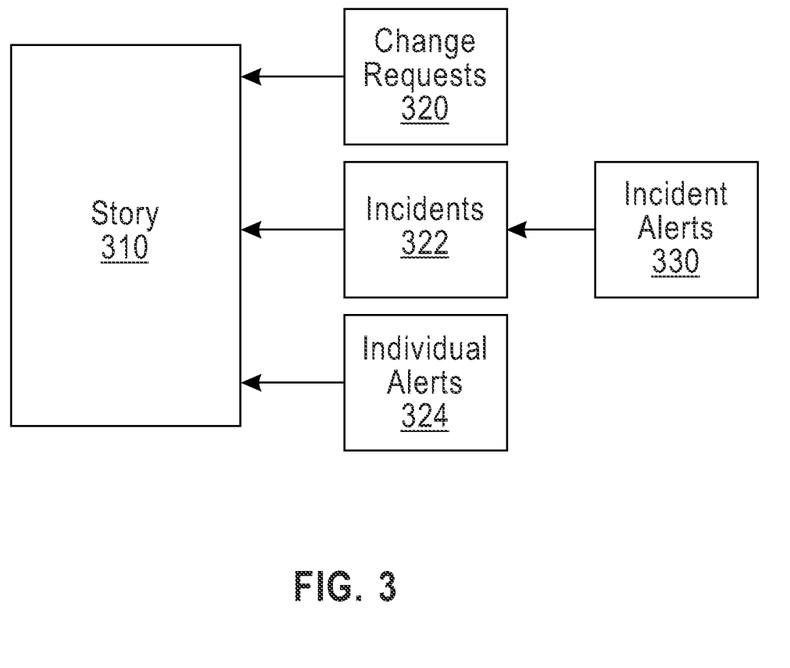
FIG. 3 is an example of a system-level overview of linking data to a story, in accordance with an embodiment of the present invention.

FIG. 3 is an example of a system-level overview of linking data to a story, in accordance with an embodiment of the present invention. In this example, story 310 is the story created by story linking program 112. Story 310 contains references to the change request and other comprehensive information about the anomaly in a monitored software system. When a story has been created, it is associated with various system objects, including change requests 320, incidents 322, and individual alerts 324. Similarly, when a new change request is created, it is linked to a story. Incident alerts 330 are the incidents received by story linking program 112, e.g., new event 212 and existing event 214 from FIG. 2, and may include anything that causes an incident investigation to start (e.g., a customer calls in, an internal event is raised that power has been lost to a server room, a monitoring system has noticed 10% of attempted purchases being declined by the credit card validation system, etc.). Incident alerts 330 may include indications of the repair cost. Individual alerts 324 includes all of incident alerts 330, and also others that did not cause an incident investigation (e.g. server response time slower than usual, a high-availability cluster has failed over to backup, etc.). The story needs to include all of this information to allow the SRE to have the best possible picture to work from.

Figure 4:
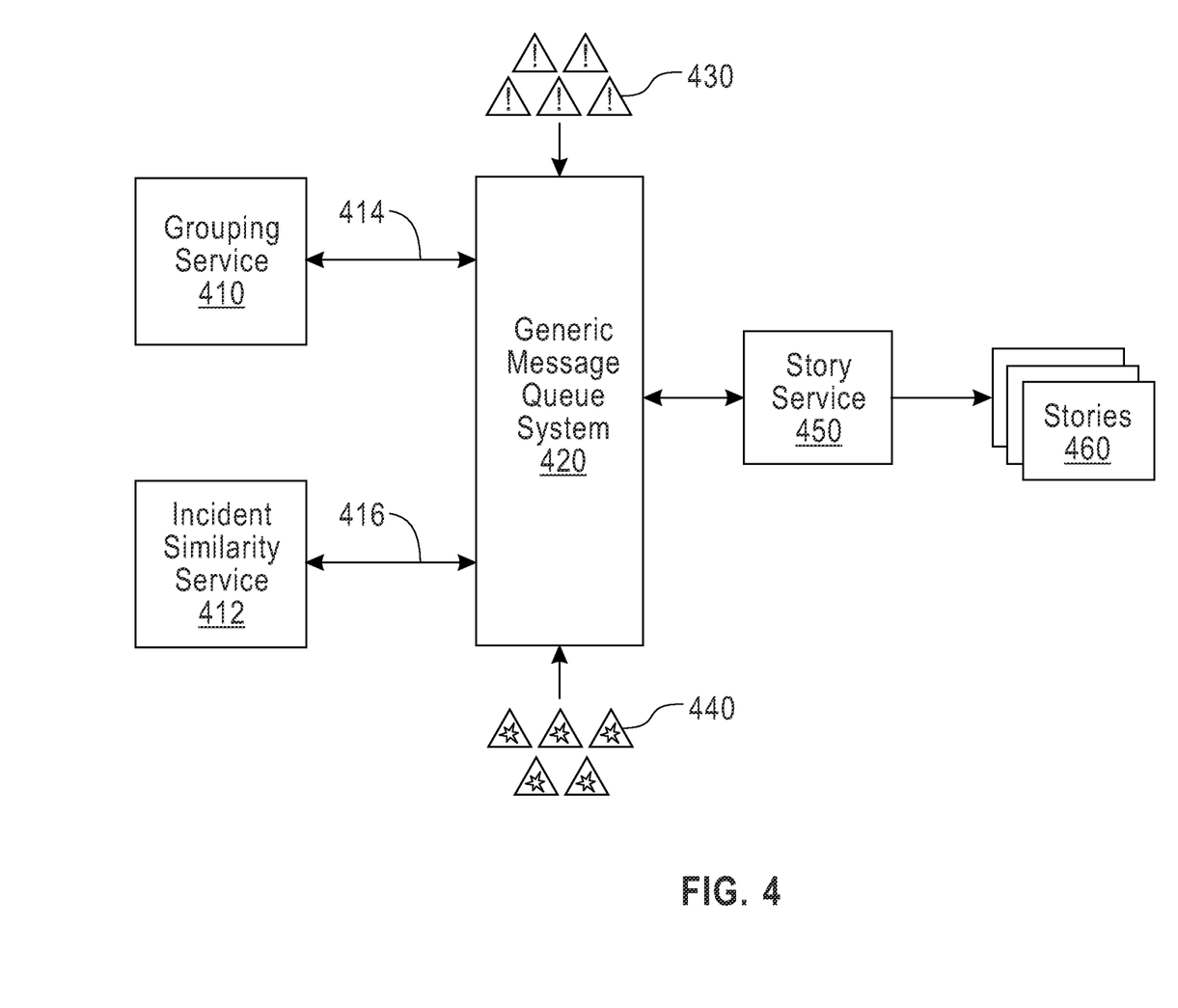
FIG. 4 is an example of creating a story, in accordance with an embodiment of the present invention.

FIG. 4 is an example of creating a story, in accordance with an embodiment of the present invention. In this example, story linking program 112 is reactively monitoring the target system by tracking events, anomalies, and incidents, and propagates this data into internal components. Internal components such as grouping service 410 and incident similarity service 412 are responsible for enhancing the original data by adding insights that allow a better understanding of the problem that occurred in the target product. In an embodiment, adding insights may include the identification of similar incidents that have previously occurred, especially when those incidents have been linked to a "Root Cause Analysis" report; the ability to see other work on similar ongoing incidents, reducing the duplication of effort by SREs; and highlighting relevant system events, which is important in an environment that contains many routine alerts that are not relevant (e.g., alerts on unrelated subsystems).

After the data is enhanced by the internal components, it is propagated into the generic message queue system 420 (shown by data streams 414 and 416), which monitors the target software product by tracking events, anomalies, and incidents, and then propagates this data into the microservices, e.g., grouping service 410 and incident similarity service 412. Generic message queue system 420 also receives reported events 430 and reported incidents 440, which are processed and published by generic message queue system 420. All of this data is passed to story service 450, which is the main function of story linking program 112. Story service 450 creates stories 460 from this data.

Figure 5:
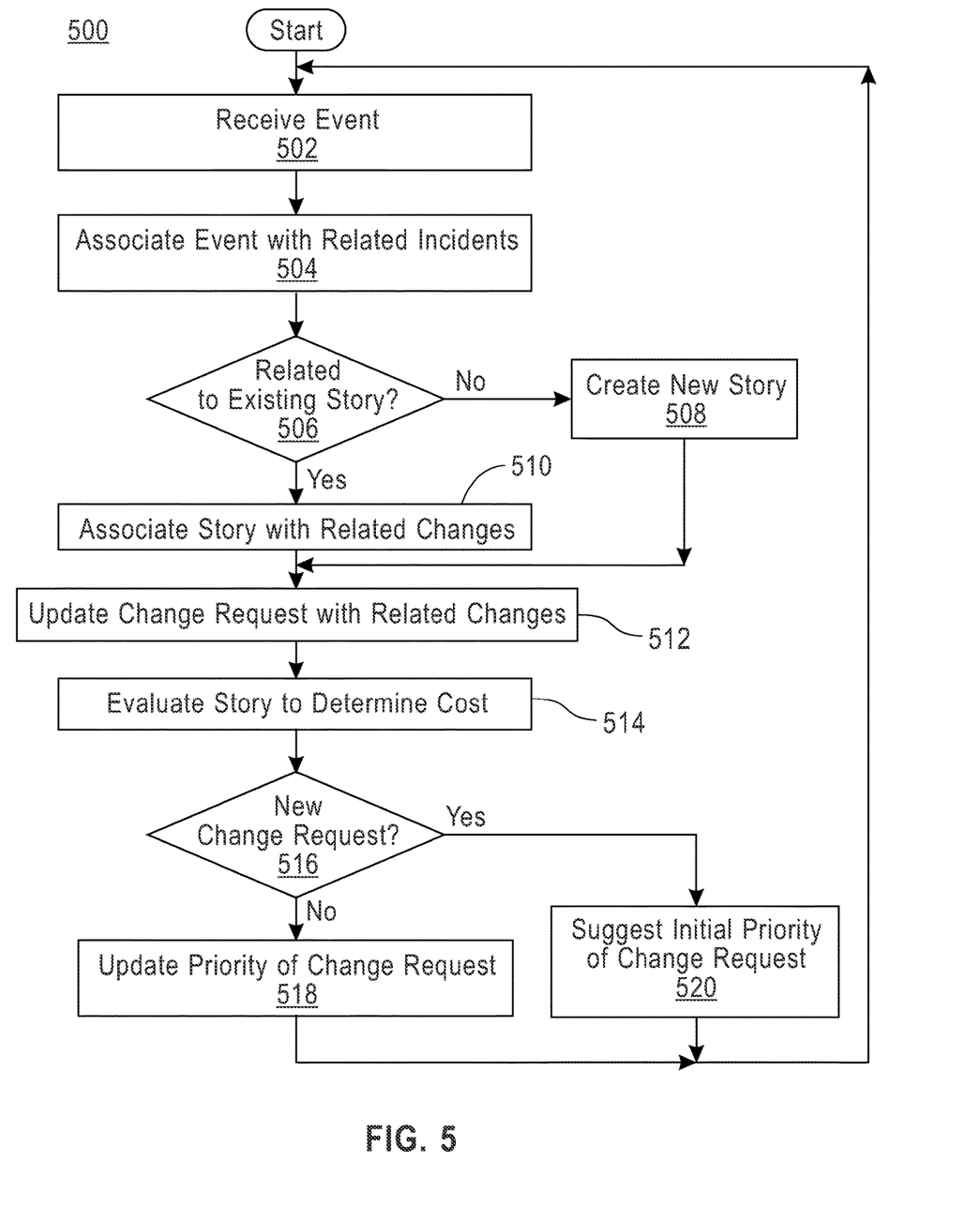
FIG. 5 is a flowchart depicting operational steps of the story linking program, on a computing device within the distributed data processing environment of FIG. 1, for linking operational data with issues, in accordance with an embodiment of the present invention.

FIG. 5 is a flowchart for the steps for the story linking program, for linking operational data with issues, in accordance with an embodiment of the present invention. In an alternative embodiment, the steps of workflow 500 may be performed by any other program while working with story linking program 112. In an embodiment, story linking program 112 receives a new event. In an embodiment, story linking program 112 associates the received event with related incidents, both past and ongoing. In an embodiment, story linking program 112 determines if the received event is related to an existing story. In an embodiment, story linking program 112 creates a new story based on the received event. In an embodiment, story linking program 112 links the received event with the related story as determined previously. In an embodiment, story linking program 112 updates the associated change request with the new data from the received event. In an embodiment, story linking program 112 evaluates the story to determine a cost that will be used to set the priority of the associated change request. In an embodiment, story linking program 112 determines whether this is a new change request or an existing change request. In an embodiment, if story linking program 112 determines that this is an existing change request, then story linking program 112 updates the priority of the existing change request based on the additional information from the new incidents. Story linking program 112 then returns to the first step to receive the next event. In an embodiment, if story linking program 112 determines that this is a new change request, then story linking program 112 notifies the SRE making the change request of a recommended initial priority setting for the change request, based on the information in the story. Story linking program 112 then returns to the first step to receive the next event.

It should be appreciated that embodiments of the present invention provide at least for linking operational data with issues. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Story linking program 112 receives an event (step 502). In an embodiment, story linking program 112 receives a new event. In an embodiment, an event refers to any type of system event, including an alert. Events may be threshold crossings such as "high CPU," timeouts such as "system not responding," user events such as "web site is returning 500-series server failure codes", and so on. In an embodiment, story linking program 112 reactively monitors the target software system by tracking events, anomalies, and incidents from the target system, and propagating this data into internal components. In an embodiment, internal components, e.g., grouping service 410 and incident similarity service 412 from FIG. 4, are responsible for enhancing the original data by adding insights that allow a better understanding of the occurred problem in the target product.

Story linking program 112 associates the event with related incidents (step 504). In an embodiment, story linking program 112 associates the received event with related incidents, both past and ongoing, from a corpus of incidents. In an embodiment, after the data is enhanced by the internal components in step 502, the data is input into the story service of story linking program 112. In an embodiment, the story service identifies how and what information needs to be aggregated together to represent a story. In an embodiment, story linking program 112 uses machine learning techniques to associate the received event with related incidents. In various embodiments, the machine learning techniques may include, but is not limited to, logistic regression, random forest, passive aggressive classifiers, support-vector machines, also called also support-vector networks, and apriori algorithm implementations. In another embodiment, story linking program 112 uses neural networks to associate the received event with related incidents. In yet another embodiment, story linking program 112 uses long short-term memory RNNs.

Story linking program 112 determines if the event is related to an existing story (decision block 506). In an embodiment, story linking program 112 determines if the received event is related to an existing story. In an embodiment, story linking program 112 uses classification to determine if the event is related to an existing story. In various embodiments, the classification may include, but is not limited to, logistic regression, random forest, passive aggressive, and support-vector machines, also called also support-vector networks. In another embodiment, story linking program 112 uses neural networks to determine if the event is related to an existing story. In various embodiments, the neural networks may include, but is not limited to, long short-term memory.

If story linking program 112 determines that the received event is related to an existing story ("yes" branch, decision block 506), then story linking program 112 proceeds to step 510. If story linking program 112 determines that the received event is not related to an existing story ("no" branch, decision block 506), then story linking program 112 proceeds to step 508 to create a new story.

Story linking program 112 creates a new story (step 508). In an embodiment, story linking program 112 creates a new story based on the received event. The procedure to create a new story is explained in FIG. 4 above.

Story linking program 112 associates the story with related changes (step 510). In an embodiment, story linking program 112 links the received event with the story to which it was determined to be related in decision block 506. In an embodiment, story linking program 112 links the software change requests to documented examples of the failure that they must address. This improves the clarity of the description, and simplifies the design of unit tests to validate the change. In an embodiment, story linking program 112 discovers previous occurrences of the underlying problem and links them with the change request. In an embodiment, story linking program 112 automatically links ongoing instances of the underlying problem to the change request, even if they occur after the request was created.

Story linking program 112 updates the change request with the related changes (step 512). In an embodiment, story linking program 112 updates the associated change request with the new data from the received event. In an embodiment, story linking program 112 evaluates the story to determine a cost that will be used to update the priority of the associated change request. In an embodiment, the cost may include, but is not limited to, downtime, number of person hours to repair, service-level agreement violations, and other factors. In an embodiment, story linking program 112 updates the change request with the updated cost. In this way, story linking program 112 makes discussions from the entire story available to the development team that builds the fix.

Story linking program 112 evaluates the story to determine its cost (step 514). In an embodiment, story linking program 112 evaluates the story to determine a cost that will be used to set the priority of the associated change request. In an embodiment, the cost may include, but is not limited to, downtime, number of person hours to repair, service-level agreement violations, and other factors. In an embodiment, story linking program 112 may receive the cost, for example, in a root cause analysis report. In another embodiment, story linking program 112 may derive the cost based on the number of individual contributors to the resolution (story), the length of time the incident remained "open", the text analysis of the comments added during resolution, or using other methods to derive a cost from context as would be known to a person having skill in the art.

Story linking program 112 determines if this is a new change request (decision block 516). In an embodiment, story linking program 112 determines whether this is a new change request or an existing change request. In another embodiment, story linking program 112 receives the determination whether this is a new change request or an existing change request from an SRE. In an embodiment, if story linking program 112 determines that this is a new change request ("yes" branch, decision block 516), then story linking program 112 proceeds to step 520. In an embodiment, if story linking program 112 determines that this is not a new change request ("no" branch, decision block 516), then story linking program 112 proceeds to step 518.

Story linking program 112 updates the priority of the change request (step 518). In an embodiment, if story linking program 112 determines that this is an existing change request, then story linking program 112 updates the priority of the existing change request based on the additional information from the new events. Story linking program 112 then returns to step 502 to receive the next event.

Story linking program 112 suggests an initial priority of the change request (step 520). In an embodiment, if story linking program 112 determines that this is a new change request, then story linking program 112 sends a notification to the SRE making the change request with advice of a recommended initial priority setting for the change request, based on the information in the story. Story linking program 112 then returns to step 502 to receive the next event.

Figure 6:
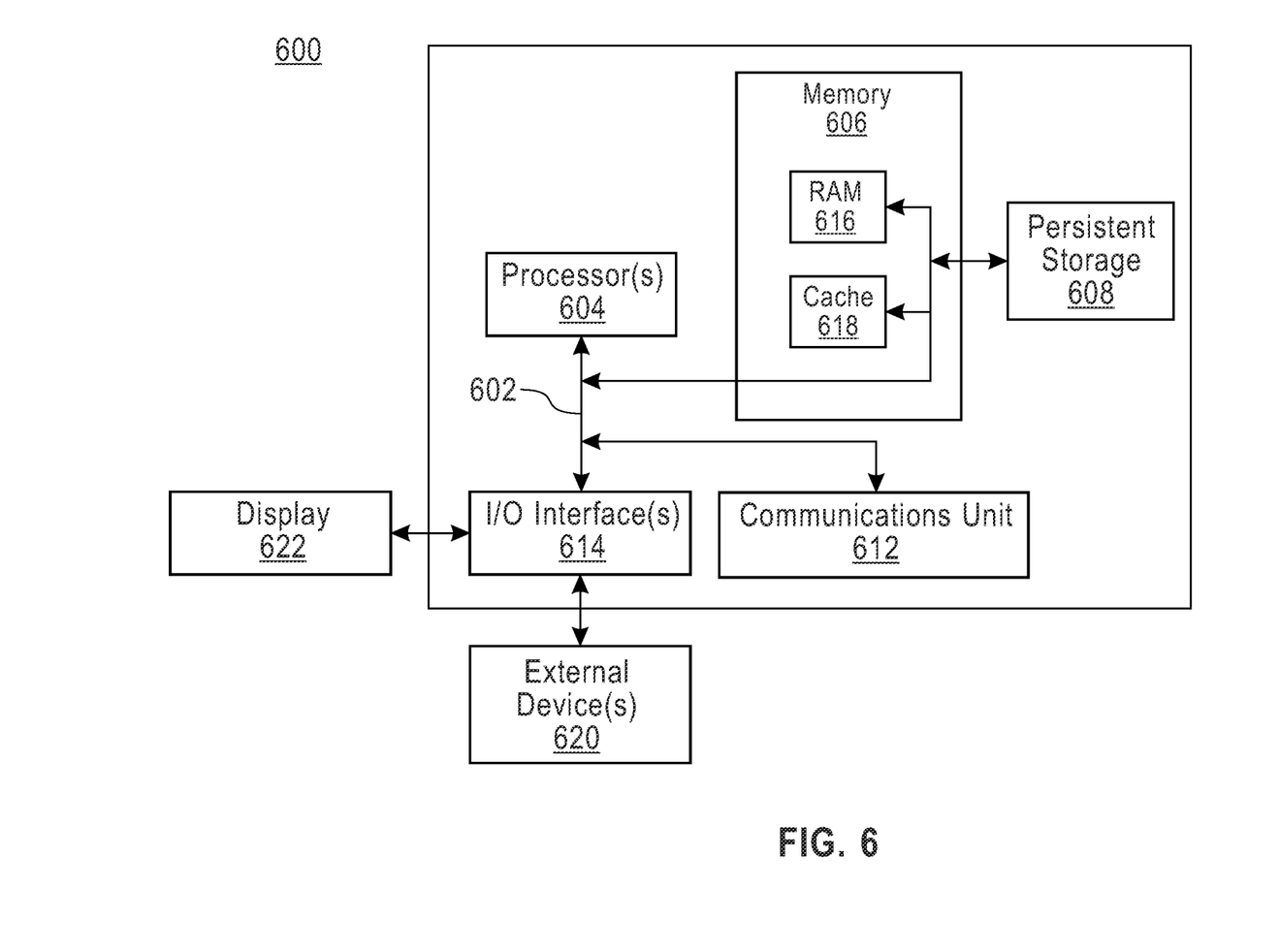
FIG. 6 depicts a block diagram of components of the computing devices executing the story linking program within the distributed data processing environment of FIG. 1, in accordance with an embodiment of the present invention.

FIG. 6 is a block diagram depicting components of computing device 110 suitable for story linking program 112, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for story linking program 112 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., story linking program 112, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for linking operational data with issues, the computer-implemented method comprising:

receiving, by one or more computer processors, a new event;

associating, by the one or more computer processors, the new event to a story, wherein the story is related to an identified problem within a system, and further wherein the new event is associated with the story using one or more machine learning techniques associating, by the one or more computer processors, the story to one or more related change requests, based on a similarity between the story and the one or more related change requests, wherein the similarity between the story and the one or more related change requests is associated using classification including logistical regression and long short-term neural networks;

determining, by the one or more computer processors, that a related change request of the one or more related change requests is a new change request;

linking, by the one or more computer processors, instances of one or more underlaying problems to the new related change request, wherein the linking occurs even if the one or more underlaying problems occur after the new related change request was created; and determining, by the one or more computer processors, a recommended initial priority setting for the new change request.

2. The computer-implemented method of claim 1, wherein the one or more machine learning techniques includes at least one of a logistic regression, a random forest, passive aggressive classifiers, support-vector machines, and apriori algorithm implementations.

3. The computer-implemented method of claim 1, wherein the story is a collection of at least one of one or more past incidents, one or more current incidents, one or more system alerts, one or more comments, one or more related changes, and one or more other artifacts.

4. The computer-implemented method of claim 1, wherein the one or more related change requests includes one or more past change requests and one or more current change requests.

5. The computer-implemented method of claim 1, wherein determining that the related change request is the new change request, further comprises calculating, by the one or more computer processors, a cost for the story.

6. The computer-implemented method of claim 5, wherein the cost for the story includes at least one of a downtime, a number person hours to repair, and one or more service-level agreement violations.

7. The computer-implemented method of claim 1, further comprising:

sending, by the one or more computer processors, the new change request to a change tracking system.

8. A computer program product for linking operational data with issues, the computer program product comprising one or more computer readable storage media and program instructions stored on the one or more computer readable storage media, the program instructions including instructions to:

receive a new event;

associate the new event to a story, wherein the story is related to an identified problem within a system, and further wherein the new event is associated with the story using one or more machine learning techniques;

associate the story to one or more related change requests, based on a similarity between the story and the one or more related change requests, wherein the similarity between the story and the one or more related change requests is associated using classification including logistical regression and long short-term neural networks;

determine that a related change request of the one or more related change requests is a new change request;

linking instances of one or more underlaying problems occurring to the new related change request, wherein the linking occurs even if the one or more underlaying problems occur after the new related change request was created; and determine a recommended initial priority setting for the new change request.

9. The computer program product of claim 8, wherein the one or more machine learning techniques includes at least one of a logistic regression, a random forest, passive aggressive classifiers, support-vector machines, and apriori algorithm implementations.

10. The computer program product of claim 8, wherein the story is a collection of at least one of one or more past incidents, one or more current incidents, one or more system alerts, one or more comments, one or more related changes, and one or more other artifacts.

11. The computer program product of claim 8, wherein the one or more related change requests includes one or more past change requests and one or more current change requests.

12. The computer program product of claim 8, determine that the related change request is a new change request, further comprises calculate a cost for the story.

13. The computer-implemented method of claim 12, wherein the cost for the story includes at least one of a downtime, a number person hours to repair, and one or more service-level agreement violations.

14. The computer program product of claim 8, further comprising:

sending, by the one or more computer processors, the new change request to a change tracking system.

15. A computer system for linking operational data with issues, the computer system comprising:

one or more computer processors;

one or more computer readable storage media; and program instructions stored on the one or more computer readable storage media for execution by at least one of the one or more computer processors, the stored program instructions including instructions to:

receive a new event;

associate the new event to a story, wherein the story is related to an identified problem within a system, and further wherein the new event is associated with the story using one or more machine learning techniques;

associate the story to one or more related change requests, based on a similarity between the story and the one or more related change requests, wherein the similarity between the story and the one or more related change requests is associated using classification including logistical regression and long short-term neural networks;

determine that a related change request of the one or more related change requests is a new change request;

linking instances of one or more underlaying problems occurring to the new related change request, wherein the linking occurs even if the one or more underlaying problems occur after the new related change request was created; and determine a recommended initial priority setting for the new change request.

16. The computer system of claim 15, wherein the one or more machine learning techniques includes at least one of a logistic regression, a random forest, passive aggressive classifiers, support-vector machines, and apriori algorithm implementations.

17. The computer system of claim 15, wherein the story is a collection of at least one of one or more past incidents, one or more current incidents, one or more system alerts, one or more comments, one or more related changes, and one or more other artifacts.

18. The computer system of claim 15, wherein the one or more related change requests includes one or more past change requests and one or more current change requests.

19. The computer system of claim 15, wherein determine that the related change request is a new change request, further comprises calculate a cost for the story.

20. The computer system of claim 15, further comprising:
sending, by the one or more computer processors, the new change request to a change tracking system.

\* \* \* \* \*